United States Patent [19]
Ohno et al.

[11] Patent Number: 5,276,486
[45] Date of Patent: Jan. 4, 1994

[54] IMAGE FORMING DEVICE

[75] Inventors: Tadayoshi Ohno; Koji Tanimoto; Mamoru Mizuguchi, all of Kawasaki; Shigeru Fujiwara, Yokohama, all of Japan

[73] Assignee: Kabushiki Kaisha Toshiba, Kawasaki, Japan

[21] Appl. No.: 28,290

[22] Filed: Mar. 9, 1993

[30] Foreign Application Priority Data

Mar. 13, 1992 [JP] Japan .................................. 4-054720
Mar. 24, 1992 [JP] Japan .................................. 4-066432

[51] Int. Cl.$^5$ ........................................... G03G 15/24
[52] U.S. Cl. ................................... 355/220; 346/160
[58] Field of Search ..................... 355/220, 200, 210; 430/55; 346/153.1, 160

[56] References Cited

U.S. PATENT DOCUMENTS

| | | | |
|---|---|---|---|
| 4,545,669 | 10/1985 | Hays et al. | 355/220 |
| 4,666,801 | 5/1987 | Kimura et al. | 430/33 |
| 4,757,332 | 7/1988 | Yuasa | 346/160 |

FOREIGN PATENT DOCUMENTS 60-90357  5/1985  Japan .
60-101570 6/1985  Japan .................. 355/220

*Primary Examiner*—R. L. Moses
*Attorney, Agent, or Firm*—Limbach & Limbach

[57] ABSTRACT

Without using corona charge, a predetermined voltage is applied to all of the island-like electrodes provide on a front surface of an electrostatic latent image forming member, which is then exposed by exposing device from a rear surface thereof. Consequently, a contrast potential is generated between the island-like electrodes two-dimensionally arranged, thereby forming an electrostatic latent image. By setting the exposing light-emitting diode array inside the electrostatic latent image forming member, the light irradiating position and the developed position can be made close to each other. Therefore, the latent image can be developed by toner at the maximum contrast potential of the electrostatic latent image on the image forming member. The toner image is then transferred and fixed on an image formation medium.

8 Claims, 5 Drawing Sheets

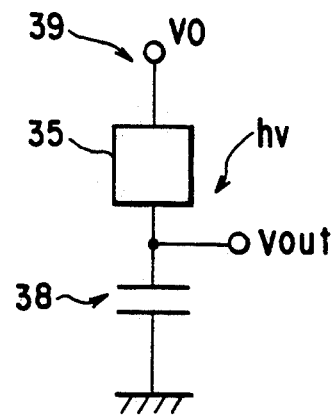
F I G. 4
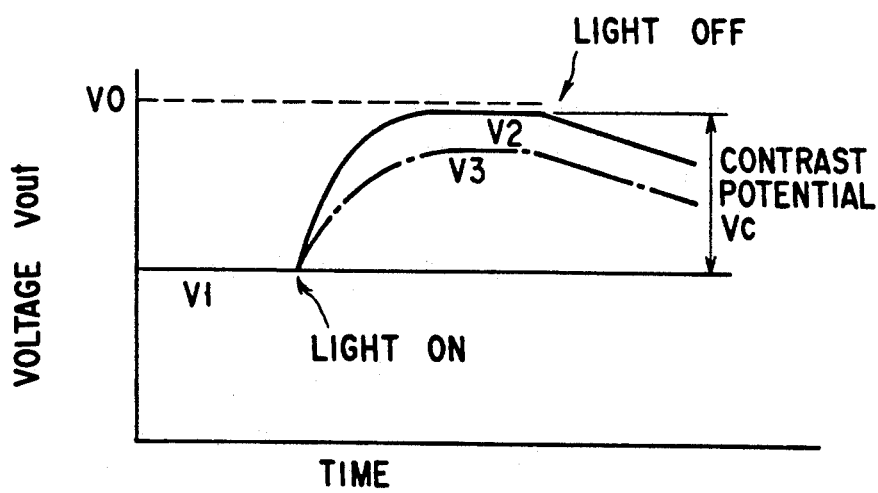
F I G. 5

IMAGE FORMING DEVICE

BACKGROUND OF THE INVENTION

1. Field of the Invention

The present invention relates to an image forming device such as a page printer, or an electronic copier which performs an electronic photographic process.

2. Description of the Related Art

In a conventional electronic photographic process performed in an image forming device such as an electronic copier or page printer, there is used a photosensitive member serving as a photoelectric converting member which converts a photo-image to an electrostatic image. The photosensitive member is precharged (adhesion of charge) by means of, for example, corona charge, and exposed in accordance with the image. The charge on the exposed section is neutralized or canceled out by the photoconduction effect of the photosensitive member, and the charge on the non-exposed section is maintained. The photo-image is then converted to a charge image. The charge image is visualized by development using toner, and the toner image is transferred and fixed on a recording medium.

The above-described electronic photographic process, which is characterized by high speed and high image quality, continues to be the main recording mode of the hard copy device as clearing possible requirements of the future, such as a higher image quality, a higher speed, and a lower running cost, of the hard copy device.

However, recently, as the usage of the copiers and the page printers is popular, and the number thereof increases, there begins to rise the problem of a poor office environment caused by these devices. In particular, in consideration of an influence on human health due to ozone generated by the corona discharge, the amount of ozone generated and leaking from these devices is very much restricted by law.

An environmental problem is and will be the most important issue, and regulations regarding ozone will be much more tighter, and there is a strong demand for reducing the amount of ozone.

SUMMARY OF THE INVENTION

In consideration of the above, the purpose of the present invention is to provide an image forming device performing an electronic photographic process which does not generate ozone.

In order to achieve the above purpose, there is provided, according to the invention, an image forming device comprising:

electrostatic latent image forming mean including plurality of photoelectric converting members arranged 2-dimensionally so as to correspond to picture elements, and means for supplying a predetermined voltage to said plurality of photoelectric converting members, each of said plurality of photoelectric converting means further including first means serving as a capacitor element and second means connected to said first means in series and serving as a photoconductive element;

exposing means for exposing said plurality of photoelectric latent image forming members by providing a photo-image on rear surfaces of said photoelectric latent image forming members;

supplying means for supplying image data to said exposing means;

developing means for developing an electrostatic latent image on front surfaces of said photoelectric latent, as a developer image;

transferring means for transferring said developer image on an image formation medium; and fixing means for fixing developer on said image formation medium on said image formation medium.

According to the image forming device of the invention, an electrostatic latent image forming member in which a plurality of photoelectric converting members each having an island-like electrode, and corresponding to a picture element are two-dimensionally arranged. A predetermined potential is applied to all of the island-like electrodes of the electrostatic latent image forming member without using corona charge, and the image forming member is exposed. Thus, a contrast potential is created between island-like electrodes two-dimensionally arranged, and an electrostatic latent image is formed. The light irradiating position and the developing position can be made close to each other by providing an exposure-light-emitting element the inside of the electrostatic latent image forming member. Consequently, the electrostatic image can be developed by toner while maintaining the contrast potential of the electrostatic latent image on the electrostatic latent image forming member at the maximum, and thus the formed toner image is transferred and fixed on an image formation medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Brief Description of the Drawings

FIG. 4 is a diagram showing a circuit equivalent to the photoelectric converting member shown in FIG. 3;

FIG. 5 is an explanatory view illustrating an operation status of the photoelectric converting member shown in FIG. 2;

Detailed Description of the Preferred Embodiments

The first embodiment of the present invention will now be described with reference to accompanying drawings.

Figure 1:
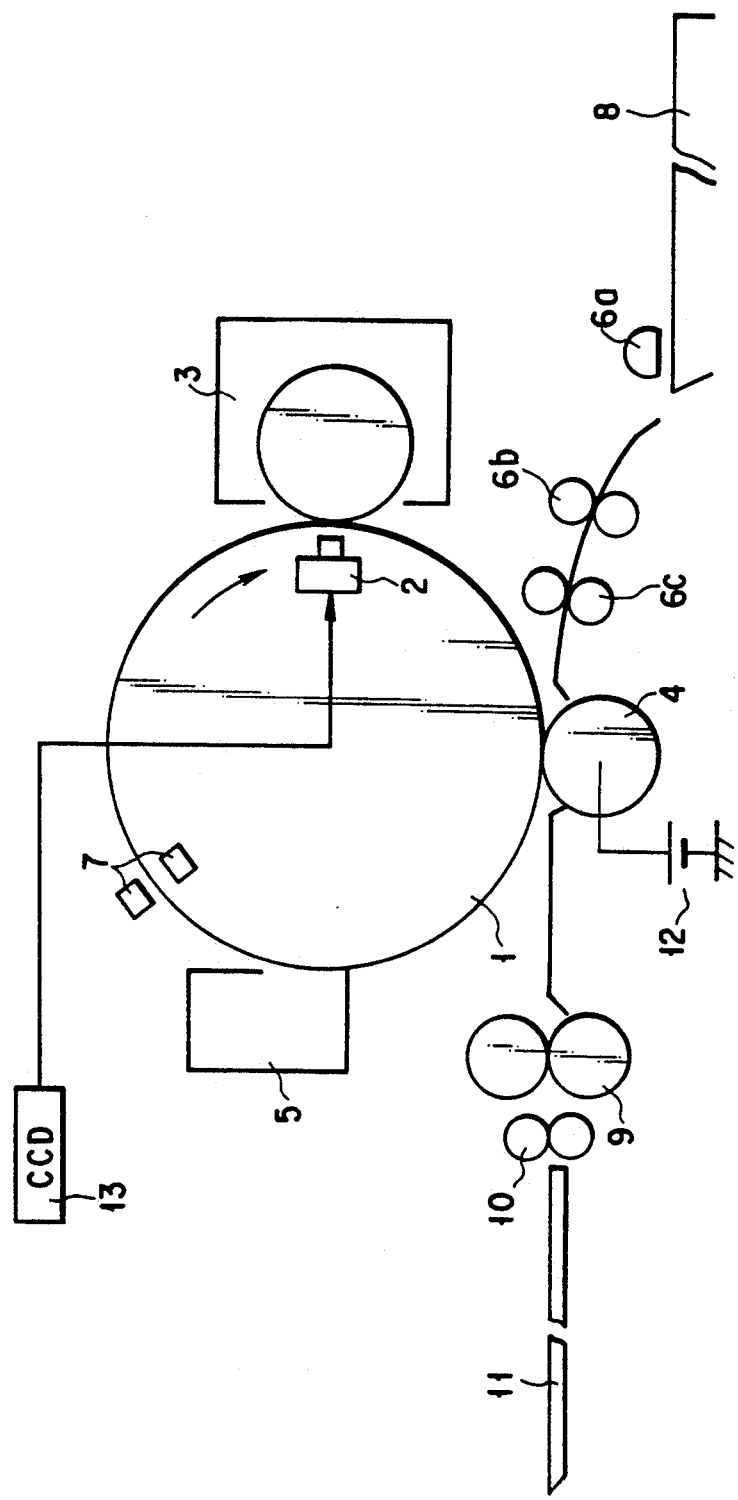
FIG. 1 is a cross section showing the main structure of a copier according to the invention.

FIG. 1 is an example of the image forming device o the invention, and schematically shows the internal structure of, for example, a copier. The copier includes an original sheet scanning portion, which is not shown in the figure, and an image forming section in combination with an electronic photographic mechanism which can form an image on an image-formation medium (paper).

The light reflected from the original sheet, and guided by the original sheet scanning portion, is photoelectrically converted into an electric signal, or image data by the photoelectric converting portion such as CCD (charge coupled divice) 13, and the electrical signal is input to an LED head portion 2 provided in an electrostatic latent image forming member for forming an electrostatic latent image. As the electrostatic latent image forming member 1 is exposed by the LED head portion 2 in accordance with an input electrical signal, an electrostatic latent image corresponding to the reflected light from the original sheet is formed on the electrostatic latent image forming member 1. Around the image forming member 1, there are provided a development device 3 for developing an electrostatic latent image on the image forming member 1 into a visible toner image by use of toner, a transfer roller 4 for transferring the toner image on the image forming member 1 to a sheet, and a cleaner 5 for cleaning the surface of the electrostatic latent image forming member 1. The development divice 3 should preferably be located at a position facing the LED head portion 2 (via the electrostatic latent image forming member 1), and more specifically, a position closest to the head portion 2. With such an arrangement, an exposure and development are simultaneously carried out on the electrostatic latent image forming member 1, and the electrostatic latent image is developed at the best contrast potential (which will be explained later).

In the LED head portion 2, there are arranged a number of LEDs (light emitting diodes) in line forming an array. The number of LED is determined substantially by the width of the exposed section of the electrostatic latent image forming member 1, and the resolution of the photoelectric converting portion. The LED head portion 2 exposes the inside (rear surface) of the image forming member 1 rotating in accordance with an image signal output from the photoelectric converting portion, which is not shown in the figure. Thus, an electrostatic latent image is formed on the surface of the image forming member 1.

In the development divice 3, toner made of resin containing colorant, and carrier are mixedly present. As being stirred in the development divice, the toner is charged by friction to have a charge having a polarity different from that of the potential generated on an island-like electrode (not shown) of the image forming member 1, which will be explained later. The rear surface of the image forming member 1 is exposed by the LED head portion 2, and an electrostatic latent image is formed on the front surface thereof. Toner clings electrostatically onto the exposed section by the contrast potential created at the latent image section, thus the electrostatic latent image is developed by the toner.

The electrostatic latent image forming member 1 on which a toner image is formed continues to rotate, and at the transfer position, the toner is transferred by the transfer roller 4 onto a sheet, which is an image formation medium supplied at an appropriate timing by a paper feeding mechanism.

The transfer roller 4 is made of an elastic resistance material, and arranged so as to attract the toner image on the electrostatic latent image forming member 1 as a potential is applied to the roller. The potential is generated by a power source 12, and a predetermined voltage is applied to the transfer roller 4.

The paper feeding mechanism includes a pick-up roller 6a, a pair of feed rollers 6b, and a pair of resist rollers 6c. A set of sheets are lifted from the paper feeding cassette 8 by the pick-up roller 6a, and only one sheet is conveyed to the resist rollers 6c by the feed rollers 6b. After alined by the resist rollers 6c, the sheet is sent to the transfer position.

A toner image brought into contact with the sheet at the transfer position is removed from the image forming member 1 by the transfer roller 4, and transferred onto the sheet. Thus, a toner image based on the image data is formed on the sheet.

The sheet on which the toner image is formed is attracted onto the surface of the electrostatic latent image forming member 1 by a electrostatic force. The sheet is removed from the image forming device 1 by removing means not shown, and sent into a fixation device 9. The fixation device 9 is a pair of heat rollers including a built-in heater, and serves to heat the toner image merely clinging on the sheet by the electrostatic force, to melt the toner for permanent fixation. After the fixation of the toner, the sheet is guided out by a pair of discharge rollers 10 onto to a paper tray 11.

In the meantime, after passing the transfer position, the electrostatic latent image forming member 1 continues to rotate, and during the rotation, remaining toner and paper dust are removed by the cleaner 5. The electrostatic latent image forming member 1 is exposed by the light source 7, and the surface of the member is de-electrified. It should be noted that the device is designed such that a series of process including scanning by the original sheet scanning portion, and conversion by the photoelectric converting portion are repeated in accordance with necessity.

Figure 2:
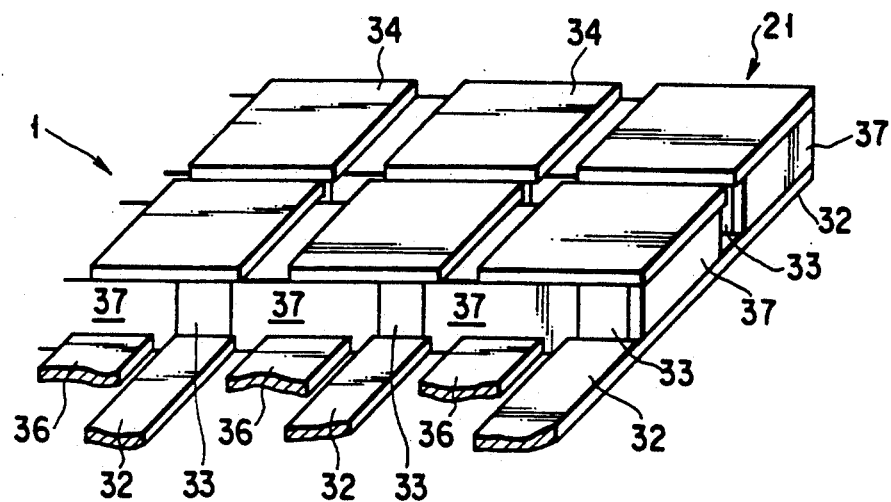
FIG. 2 is a schematic perspective view showing the first embodiment of the electrostatic latent image forming member shown in FIG. 1.
Figure 3:
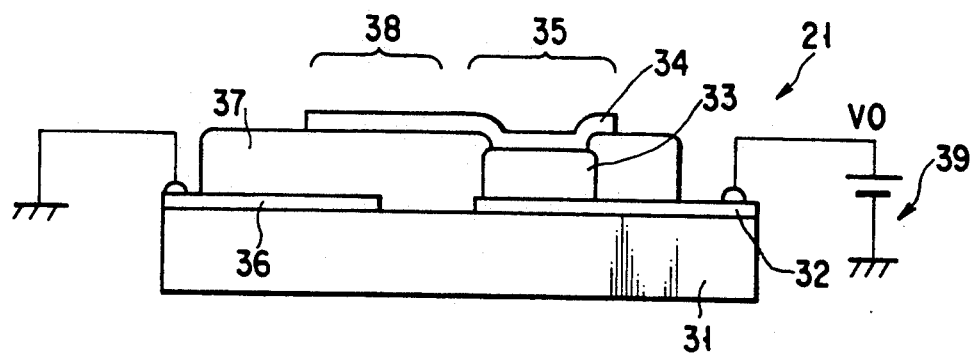
FIG. 3 is a schematic cross section of the photoelectric converting member shown in FIG. 2.

The electrostatic latent image forming member 1 will be described in more detail with reference to FIGS. 2 and 3. FIG. 2 schematically shows a part of the electrostatic latent image forming image 1, and FIG. 3 schematically shows a cross section of the photoelectric converting member 21.

In the electrostatic latent image forming member 1, a number of photoelectric converting members 21 are arranged two-dimensionally such that each member 21 correspond to a predetermined picture element in the image data one by one.

In each of the photoelectric converting members 21, a transparent electrode 32, a photoconductive layer 33, and an island-like electrode 34 are formed on a transparent insulation substrate 31 to make a photoconductive element 35, whereas an electrode 36, an insulation layer 37, and the island-like electrode 34 are formed one on another to make a capacitor element 38. The photoconductive element 35 and the capacitor element 38 are connected to each other in series via the island-like electrode 34. The transparent electrode 32 of the photoconductive element 35 is connected to the power source 36, and the electrode 36 of the capacitor element 38 is grounded.

As shown in FIG. 2, the photoconductive layers 33 are arranged separately from each other; however those layers 33 placed in the same row are connected via a transparent electrode 32. Further, an electrode 36 is arranged in parallel with the transparent electrode 32. The capacitor element 38 is formed at a section where the electrode 36 faces the island-like electrode 34.

As in the case of the photoconductive elements 35, those capacitor elements 38 arranged in the same row are connected to each other via an electrode 36. The transparent electrodes 32 are connected with each other, and so are the electrodes 36. The transparent electrodes are further connected to the power source, whereas the electrodes 36 are grounded.

In the image forming member 1, a potential is created uniformly on the entire surface of each island-like electrode 34 provided correspondingly to a picture element, and an arrangement of the picture elements is fixed; therefore formation of picture elements can be carried out without creating a pitch error both in the main and sub-scanning directions.

The electrostatic latent image forming member 1 is applied to a conventional electronic photographic process in place of a conventional photosensitive member to achieve a new electronic photographic process which does not involve a corona discharge.

Each of the photoelectric converting means 21 is manufactured in the following manner.

An ITO (indium-tin oxide) film is formed on a cleaned glass substrate (coning 705) by sputtering, and a transparent electrode 32 and an electrode 36 are patterned by a conventional photo etching process (PEP). An amorphous silicon (a-Si) film is further formed on the transparent electrode 32 and the electrode 36 by means of plasma CVD (chemical vapor deposition), and then the film is partially etched leaving a predetermined section by a photo-etching method. Thus, a photoconductive layer 33 is formed on the transparent electrode 32.

Next, an $SiO_2$ film is formed on the resultant, and the portion of the $SiO_2$ film located on the photoconductive layer 33 is removed by photo-etching. Then, a chrome thin film is deposited, and the deposited chrome thin film is patterned into a predetermined-sized rectangular including the crossing section of the photoconductive layer 33 and the transparent electrode 32, thus forming an island-like electrode 34.

For the purpose of simplification, a transparent type is used as an electrode 36 in the above-described step; however the electrode 36 does not have to be transparent, but may be formed as of a opaque type in a step other than that of the electrode 32. Further, the space between island-like electrodes 34 may be filled with, for example, an insulating silicon oxidation layer, to make the surface flat for easy cleaning of remaining toner.

The operation of the photoelectric converting member 21 will be described. FIG. 4 is a circuit diagram equivalent to the photoelectric converting member 21 shown in FIG. 3. The photoconductive element 35 and the capacitor element 38 are connected with each other in series, and a potential Vout at the connecting portion appears at the island-like electrode 34. The appeared potential is the potential of an electrostatic image converted from a photo-image.

At the initial stage, the capacitor element 38 has not been on charge, and therefore the Vout is 0 volt. In a dark state, a voltage V0 is applied to the photoconductive element 35 and the capacitor element 38. Since it is in a dark state, the photoconductive element 35 serves as a capacitor element, and therefore the applied voltage V0 is divided into these elements in accordance with the capacitance ratio between the photoconductive element 35 and the capacitor element 38, and between the electrode 36 and the transparent electrode 42. In this embodiment, the space defined between the electrode 36 and the transparent electrode 32 is designed to be larger than the thickness of the photoconductive layer 33, and therefore the most of an applied voltage is divided into the photoconductive element 35 and the capacitor element 38. Consequently, a voltage V1 appears at the island-like electrode 34 as shown in FIG. 5. The larger the ratio between the thickness of the photoconductive layer, and the width of the space, the higher the ratio of an applied voltage distributed to the photoconductive element 35 and the capacitor element 38. The former ratio should be 1 or higher, or preferably 2 or higher.

When light is irradiated on the photoconductive element 36 through the light-receiving surface (at the bottom) of the transparent substrate 31, the photoconductive layer 33 becomes conductive, and a voltage Vout appears at the island-like electrode 34 as shown in FIG. 5 increases from a voltage V1, which is a voltage before irradiance of light, to a voltage V2, the value of which is close to that of the applied voltage V0 from the power source 39. The time constant of the increase in voltage depends mainly on the time constant of the photoconductive layer 33 and the capacitor element 38.

In the case where no light is irradiated, the voltage (Vout) which appears at the island-like electrode 34 is V1. Therefore, by irradiance or no irradiance of light, a contrast potential $Vc=V2-V1$, can be obtained. After irradiance of light is finished, the photoconductive element 35 recovers the non-conductive state; however charge remains on the capacitor element 38. In the above-described manner, the photoconductive element converts a photo-image to an electrostatic image.

As mentioned before, since a voltage V0 is applied even after irradiance of light is finished, the discharge of the charge on the exposed section of the capacitor element 38 is delayed. Consequently, the voltage decreases gradually from V2 as shown in FIG. 5. Thus, a contrast potential between the exposed and non-exposed sections is sustained after completion of exposure. It should be noted here that the LED 2 and the development divice 3 are arranged to face to each other so as to develop an electrostatic latent image at the maximum contrast potential. More specifically, the distance between the LED 2 and the development divice 3 in the rotation direction of the electrostatic latent image forming member 1 is set minimum.

By controlling the amount of light irradiated on the photoconductive element 35, the contrast potential can be varied. It is well-known that a photoconductive material such as a-Si varies its conductivity in accordance with the amount of energy of light irradiated. The above-provided description is directed to the case where the photoconductive element 35 is almost completely made conductive, and a voltage applied from the power source 39 is input to the capacitor element 38 without a substantial loss. In the case where the amount of light irradiated on the photoconductive element 35 is limited, suppressing the voltage drop in the element, the voltage distributed to the capacitor element 38 is a difference between the power source voltage V0 and the voltage drop at the photoconductive element 35, a voltage V3, which is lower than the above case, appears at Vout. Thus, the electrostatic image potential can be varied in accordance with the amount of energy of light irradiated on the photoelectric converting member 21.

Therefore, in the electrostatic latent image forming member 1 in which a number of photoelectric converting members 21 are arranged two-dimensionally, a voltage V2 appears at an island-like electrode 34 corresponding to a picture element in accordance with the amount of light irradiated on each photoelectric converting member 21.

The above descriptions are directed to the cases where a voltage is applied to a photoconductive converting member 21 from the power source 39 all through the series of operation; however the invention can be also designed for the case where a voltage is supplied from the power source 39 only while light is being irradiated. An electrostatic latent image forming member 1 used in such a case would have a structure in which elements supplying electricity to photoelectric converting members 21 are connected with each other in the main scanning direction of the original sheet image, but are separated from each other in the sub-scanning direction. In image forming devices including the electrostatic latent image forming member 1 of the above-described structure, an electric supply to a group of photoelectric converting members, which are subjected to the steps of exposure, development and transfer, can be controlled in accordance with each step.

Figure 6:
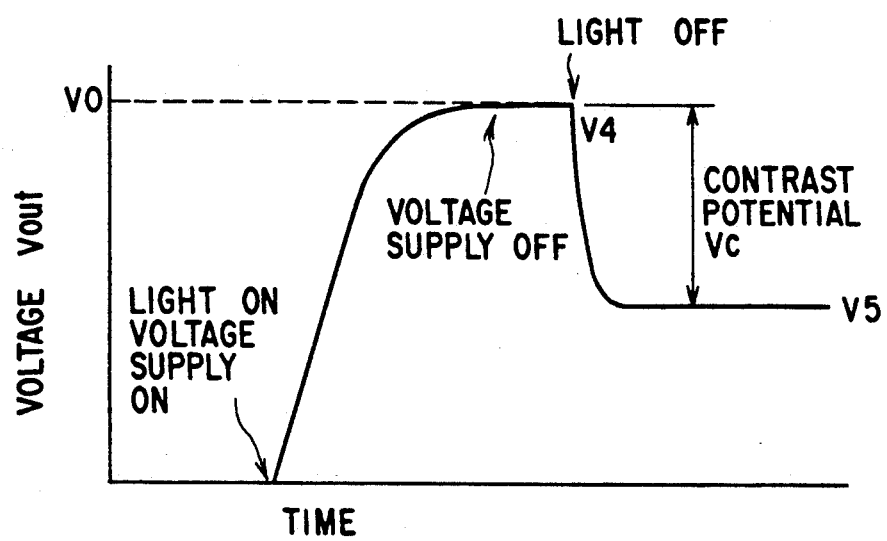
FIG. 6 is an explanatory view illustrating another operation status of the photoelectric converting member shown in FIG. 2.

The operation of electrostatic latent image formation in the this case will now be described. As shown in FIG. 6, when a voltage is applied in synchronous with light irradiated, a capacitor element 38 is charged by a potential V0 via a photoconductive element 35. Consequently, a voltage V4, which is close to the applied voltage V0, appears as the output of Vout. When the application of the voltage is stopped immediately before the completion of light irradiance, the photoconductive element 35 recovers the status in which it serves as a capacitor element upon finishing of light irradiance. At this point, there is no electricity supplied from the power source 39, and therefore the charge stored in the capacitor element 38 is divided into the capacitor element 38 and the photoconductive element 35, setting the output of the Vout to V5, which is close to V1. Since V1 is generated at the output Vout of a photoelectric converting element 21 on which light is not irradiated, a contrast potential $VC = V4 - V1$ can be obtained by inputting or not inputting light.

In the image forming device employing the electrostatic latent image forming member 1, a development is carried out while an image exposure is performed on photoelectric converting members 21 of the electrostatic latent image forming member 1. An electrostatic latent image voltage V0 is applied to a group of photoelectric converting members which are image-exposed, and at the same time, a transfer voltage can be applied to a group of photoelectric converting members on which a transfer process is carried out. In order to de-electrify the electrostatic latent image forming member 1, light should be irradiated from the bottom side (the transparent insulating substrate side) after turning OFF the electrode 32.

The second embodiment of the invention will now be described.

Figure 7:
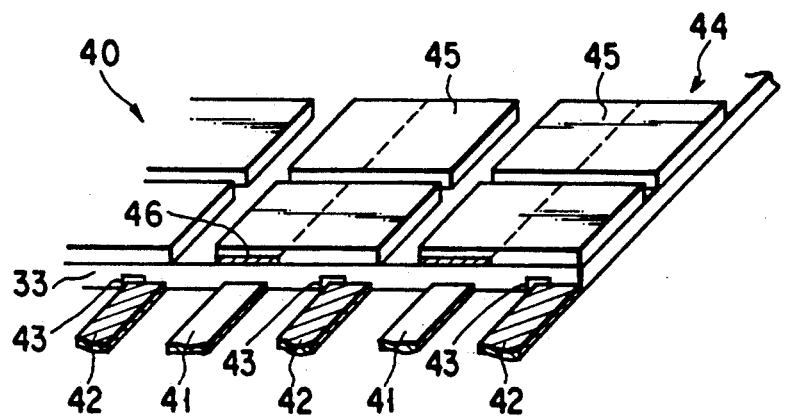
FIG. 7 is a schematic perspective view of the second embodiment of the electrostatic latent image forming member.
Figure 8:
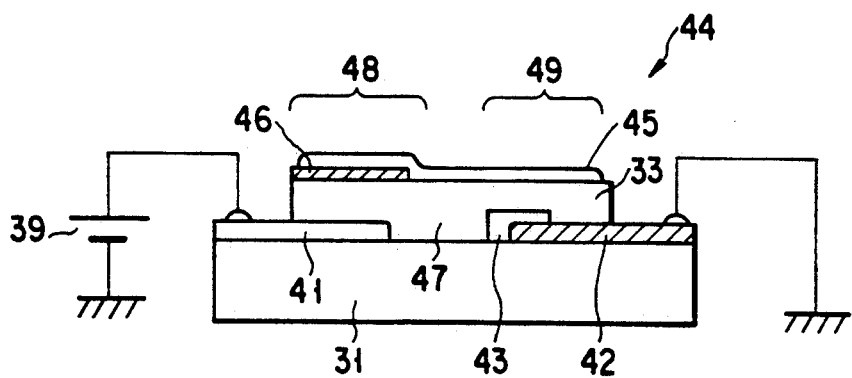
FIG. 8 is a schematic cross section of the photoelectric converting member shown in FIG. 7.

FIG. 7 is a diagram schematically showing a part of an electrostatic latent image forming member 40, and FIG. 8 is a schematic diagram of a cross section of a photoelectric converting member 44.

Each photoelectric converting member 44 has a structure in which a transparent electrode 41 is formed on a transparent insulating substrate 31, and an opaque electrode 42 is formed away from the transparent electrode 41 by a space 47. An insulation layer 43 is provided between the end portion of the opaque electrode 42 and the space 47, and a photoconductive layer 33 is formed extending over both transparent and opaque electrodes 41 and 42. A conductive opaque member 46 is formed on the photoconductive layer 33 on the side facing the transparent electrode 41. On the conductive opaque member 46 and the photoconductive layer 33, an island-like transparent picture element electrode 45 is formed so as to correspond to a picture element.

The power source 39 is connected to the transparent electrode 41, and the opaque electrode 42 is grounded. The transparent electrode 41, the photoconductive layer 33, the conductive opaque member 46, and the transparent picture element electrode 45 give rise to the first functional portion 48, and the opaque electrode 42, the photoconductive layer 33, and the transparent picture element electrode 45 give rise to the second functional portion 49.

The photoelectric converting member 44 of the second embodiment includes the two functional portions 48 and 49 each having an electrode-photoconductive-layer-electrode structure, and can serve as both capacitor and photoconductor elements depending on the direction of light irradiated. More specifically, in the case where the surface of receiving light is the transparent insulation substrate 31, the first functional portion 48 performs a photoconductive element function, and the second functional portion 49 performs a capacitor element function. In the case where the surface of receiving light is the transparent picture element electrode 45, the first functional portion 48 performs a capacitor element function, and the second functional portion 49 performs a photoconductive element function.

The insulation layer 43 electrically insulates the opaque electrode 42 from the photoconductive layer 33 made conductive by the light irradiated through the space between the transparent electrode 41 and the opaque electrode 42.

The photoelectric converting member 44 is manufactured in the following manner. First, a 2 μm-thick ITO is formed on a cleaned glass substrate (Coning 705), and then by a general photo-etching, transparent electrodes 41 each having a width of 30 μm, are formed at a constant pitch of 125 μm (in a direction parallel to the cross section shown in FIG. 3). The transparent electrodes 41 are connected with each other by one ends of the same side (not shown), and thus an external terminal connection portion is formed to be connected to the power source 39.

The opaque electrode 42 is formed by vapor depositing, for example, a chrome thin film on a glass substrate, followed by photo-etching the thin film for patterning the electrode.

Next, an insulation layer 43 is formed between the transparent and opaque electrodes 41 and 42, and more specifically, a 1 μm-thick SiO$_2$ film is formed by sputtering with one end of the opaque electrode 42 covered. Further, the space between the transparent electrode 41 and the insulation layer 43 is set to be 40 μm.

Further, a 20 μm-thick amorphous silicon film is formed on the transparent electrode 41, the opaque electrode 42, and the insulation layer 43 by plasma CVD. Then, by means of photo-etching, the film is patterned into a band-like section partially covering both transparent and opaque electrodes 41 and 42, thereby forming a photoconductive layer 33. A 1 μm-thick chrome thin film is vapor deposited on the photoconductive layer 33, and a conductive opaque member 46 is formed at a position above the transparent electrode 41 via the photoconductive layer 33.

A 2 μm-thick ITO film is formed to cover the conductive opaque member 46 and the photoconductive layer 33, and then patterned into independent 100 μm-square rectangular arranged at a pitch of 125 μm, thus forming picture element electrodes 45 in a two-dimensional manner. The transparent electrode 41 is connected to the power source 39 via an external connection terminal, and the opaque electrode 42 is grounded via an external connection terminal.

The operation of the photoelectric converting member 44 will be described. In the case where light is irradiated from the transparent substrate 31, in other words, from the lower side in the figure, the operation of the photoelectric converting member 44 is similar to that of the corresponding one of the embodiment 1 described before. In short, the first functional portion 48 serves as a photoelectric element, and the second functional portion 49 serves as a capacitor element. The capacitor element (the first functional portion) 49 and the photoconductive element (the second functional portion) 48 are connected in series via an island-like electrode 45. With the above-mentioned structure, a potential (Vout) corresponding to the intensity or amount of light irradiated in the photoconductive element 33 appears at the island-like electrode.

At the initial stage, the capacitor element 49 has not been charged, and therefore Vout is 0 volt. In a dark state, a potential V0 is supplied from the power source 39 to the transparent electrode 41. Since it is in a dark state, the photoconductive element 48 serves as a capacitor. The applied voltage is divided in accordance with the capacity ratio between the photoconductive element 48 and the capacitor element 49. Thus, as shown in FIG. 5 of the first embodiment, V1 is generated at the output Vout of the photoelectric converting member 44.

When light is irradiated from the transparent insulation substrate 31 side, the light is irradiated on the photoconductive layer 33 of the photoconductive element 48 through the transparent electrode 41. Since the light irradiated on the substrate 31 is blocked by the opaque electrode 42, the photoconductive layer 33 interposed between the electrodes 45 and 42 serves substantially as an insulator. In the meantime, the photoconductive element 33 of the photoconductive element 48 is made conductive, and the potential of the transparent electrode 45 increases from the voltage V1, which is the potential before irradiance of light, up to V2, which is close to the potential of the power source.

By irradiating or not irradiating light, a contrast potential Vc=V2−V1 can be obtained. An electrostatic latent image is formed from the contrast potential Vc, and toner is attracted to the latent image. The toner is then transferred onto a sheet of paper, forming an image thereon.

The surface of the electrostatic latent image forming member 1 must be de-electrified for the next exposure. For de-electrification, after stopping the application of the voltage from the power source 39, the latent image forming member 1 is exposed from both surface sides by use of two light sources 7 as shown in FIG. 7, and thus the potential of the transparent picture element 45 is set substantially to be 0V (de-electrification). This is because the functional portions 48 and 49 both serve as photoconductive elements, and the electrodes 41, 45, and 46 are grounded via the photoconductive element 33.

As described above, according to the present invention, a chargeless electronic photographic process which does not produce ozone can be achieved by use of an electrostatic latent image forming member for converting a photo-image into an electrostatic image without supplying charges from outside by means of corona charger or the like. Further, an electronic photographic process which can perform a graduation recording can be achieved by chargeless. Further, the exposure position and the toner adherence position are very close to each other, toner is adhered to the electrode at the maximum contrast potential of an electrostatic latent image on an island-like electrode 45, thereby achieving formation of a clear image on a sheet.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. An image forming apparatus, comprising:
   an electrostatic latent image forming body, on a front surface of which an electrostatic latent image is formed, including a plurality of photoelectric converter arranged 2-dimensionally so as to correspond to picture elements, and means for supplying a predetermined voltage to said plurality of photoelectric converter, each of said plurality of photoelectric converter further including a first photoconductive portion which has an opaque layer on the electrostatic latent image formatting side and a second photo-conductive portion which has an opaque layer on a photo-image receiving side, wherein both the portions are connected in series through a transparent electrode, such that a potential between said first and second photoconductive portions is varied in response to presence and absence of a light irradiated into said second photoconductive portion and the electrostatic latent image is formed according to the potential;
   means for exposing said electrostatic latent image forming body by sending the photo-image onto the rear surface of said electrostatic latent image forming body;
   means for developing an electrostatic latent image on the front surface of said electrostatic latent image forming body by means of a developing agent;
   means for transferring a developing agent image on an image formation medium; and
   means for de-electrifying charge remaining on said electrostative latent image forming member after the transfer of said transfer means, by exposing the front and rear surface thereof.

2. An image forming apparatus, according to claim 1, wherein each of said plurality of photoelectric converter including a transparent insulation substrate as a rear surface, which receive the photo-image, of said electrostatic latent image forming body, a transparent first electrode and an opaque second electrode formed away from each other on another surface opposite to the photo-image receiving surface of said transparent insulation substrate, an insulation layer provided at an end of said opaque second electrode on said transparent first electrode side, a photoconductive layer formed extending over said transparent first electrode, said insulation layer and said opaque second electrode, an opaque third electrode formed on an upper portion of said transparent first electrode via said photoconductive layer, a transparent fourth electrode formed on said opaque third electrode and said photoconductive layer, said front surface of the electrostatic latent image forming body having a plurality of said transparent fourth electrodes, said transparent first electrode, said photoconductive layer and said opaque third electrode serving together as a photoconductive element when light is irradiated from the rear surface of said electrostatic latent image forming body, and a capacitor element when light is irradiated from the front surface, said opaque second electrode, said conductive layer, said insulation layer and said transparent fourth electrode serving together as a capacitor element when light is irradiated from the rear surface, and a photoconductive element when light is irradiated from the front surface, and an electrostatic latent image corresponding to the photo-image sent from the rear surface of said electrostatic latent image forming body being formed on said front surface.

3. An image forming device according to claim 1, wherein said exposing means and said developing means are arranged substantially opposite to each other interposing said photoelectric converter therebetween, and a distance therebetween is reduced to minimum.

4. An image forming device according to claim 1, wherein said exposing means have an LED array.

5. An image forming apparatus, comprising:
electrostatic latent image forming body, on a front surface of which an electrostatic latent image is formed, including a plurality of photoelectric converter arranged 2-dimensionally so as to correspond to picture elements, and means for supplying a predetermined voltage to said plurality of photoelectric converter, each of said plurality of photoelectric converter further including first portion serving as a capacitor element and second portion serving as a photoconductive element, wherein both the portions are connected in series through a transparent electrode, such that a potential between said first and second portions is varied in response to presence and absence of a light irradiated into said second portion and the electrostatic latent image is formed according to the potential;
means for exposing said plurality of photoelectric latent image forming body by sending a photo-image on rear surfaces of said photoelectric latent image forming body;
means for developing an electrostatic latent image on front surfaces of said photoelectric latent image forming body, as a developer image.

6. An image forming device according to claim 5, wherein each of said plurality of photoelectric converter further includes a transparent insulation substrate constituted as a rear surface, which receive the photo image, of said transparent latent image forming body, a first electrode and a transparent second electrode formed away from each other on another surface opposite to the photo-image receiving surface of said transparent insulation substrate, a photoconductive layer formed on said transparent second electrode, an insulation layer formed on said first electrode, and a third electrode formed extending over said insulation and said photoconductive layer, said first electrode, said insulation layer and said third electrode serving together as a capacitor element, said front surface of said electrostatic latent image forming body having a plurality of said third electrodes arranged independent from each other, and an electrostatic latent image corresponding to the photo-image irradiated from the rear surface of said electrostatic latent image forming body being formed on said front surface.

7. An image forming device according to claim 5, wherein each of said plurality of photoelectric converter further includes a transparent insulation substrate constituted as a rear surface, which receive the photo-image, of said transparent latent image forming body, a transparent first electrode and an opaque second electrode formed away from each other on another surface opposite to the photo-image receiving surface of said transparent insulation substrate, an insulation layer provided at an end of said opaque second electrode on said transparent first electrode side, a photoconductive layer formed extending over said transparent first electrode, said insulation layer and said opaque second electrode, a opaque third electrode formed on an upper portion of said transparent first electrode via said photoconductive layer, a transparent fourth electrode formed on said opaque third electrode and said photoconductive layer, the front surface of the electrostatic latent image forming body having a plurality of said transparent fourth electrodes, said transparent first electrode, said photoconductive layer and said opaque third electrode serving together as photoconductive element when light is irradiated from the rear surface of said electrostatic latent image forming body, and a capacitor element when light is irradiated from the front surface, said opaque second electrode, said conductive layer, said insulation layer and said transparent fourth electrode serving together as capacitor element when light is irradiated from the rear surface, and a photoconductive element when light is irradiated from the front surface, and an electrostatic latent image corresponding to the photo-image sent from the rear surface of said electrostatic latent image forming body being formed on said front surface.

8. An image forming device according to claim 7, further comprising:
means for de-electrifying said electrostatic latent image forming body by irradiating light on both front and rear surfaces thereof.

* * * * *